Sept. 28, 1971  J. J. NASH  3,608,423
ELECTRICAL CONTACT ASSEMBLY FOR ROCKET LAUNCHERS
Filed Oct. 23, 1968  2 Sheets-Sheet 1
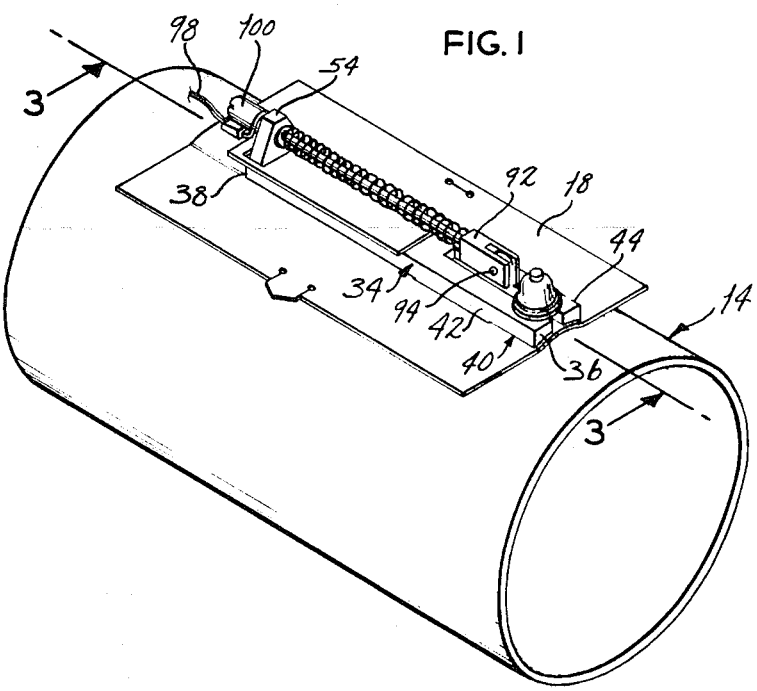
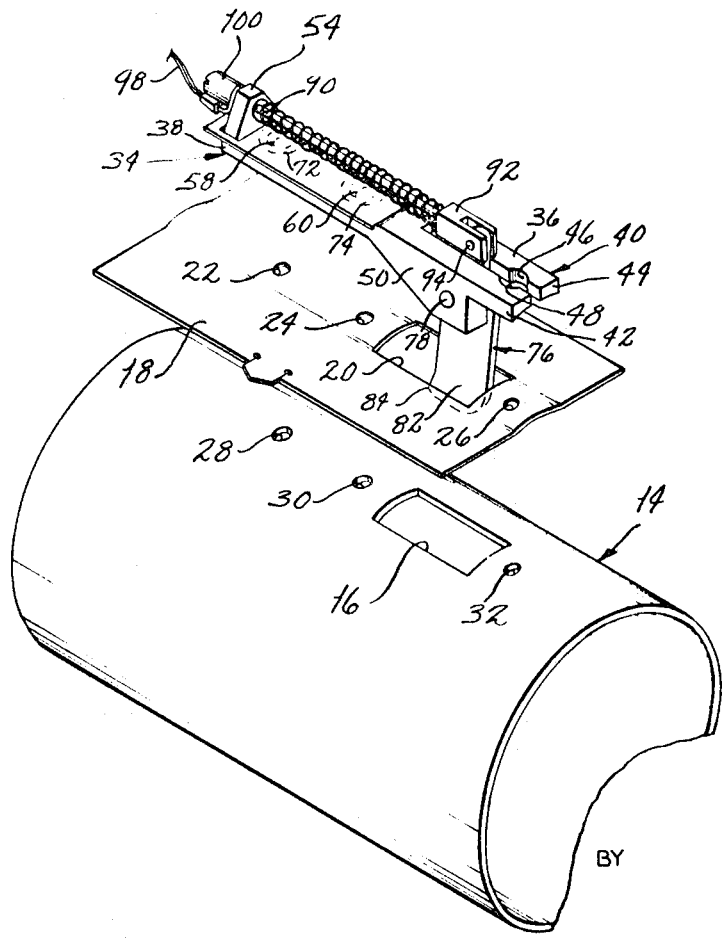
INVENTOR
JOHN J. NASH
ATTORNEY

United States Patent Office 3,608,423
Patented Sept. 28, 1971

3,608,423
ELECTRICAL CONTACT ASSEMBLY FOR ROCKET LAUNCHERS
John J. Nash, Ferguson, Mo., assignor to Alsco, Inc., St. Louis, Mo.
Filed Oct. 23, 1968, Ser. No. 769,991
Int. Cl. F41f 3/04
U.S. Cl. 89—1.807                                   4 Claims

ABSTRACT OF THE DISCLOSURE

A spring-loaded electrical contact assembly for rocket launchers is comprised of an elongated striker arm bracket mounted upon a rocket-launching tube, a striker pivotally mounted to the bracket and having a portion extending within the launching tube and contacting the ignition cap of a rocket positioned therein, means for introducing electrical current to the striker, and spring means operatively connected to the bracket. The spring means yieldably urges the striker about its pivotal connection with the bracket so that a portion of the striker is yieldably held in electrical contact with the ignition cap of the rocket.

---

Figure 3:
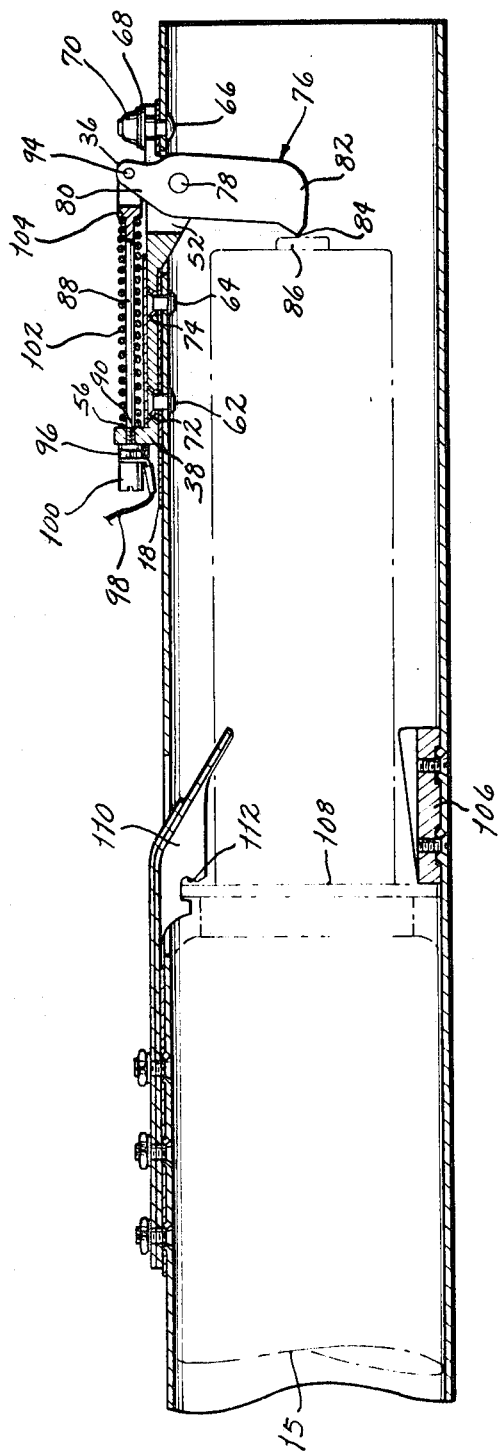

This invention relates to rocket launchers, and more particularly to an electrical contact assembly for rocket launchers.

At the present time the contact devices utilized on rocket launchers for providing electrical contact with the ignition caps of the rockets often lose contact during vibration or other types of jostling of the rocket launcher. When the rocket launchers are being used it is important that the contact assembly maintain constant positive electrical contact with the ignition cap of the rockets. This invention provides a spring-loaded contact assembly which will maintain positive electrical contact during vibrations, jostling, or other types of shocks which may be applied to the rocket launcher. Another problem which is often encountered with contact assemblies is that they may be damaged during loading. Because the rocket is loaded by sliding it into the rocket launcher tube and because such loading is often done in haste, the rocket may strike the contact assembly with considerable force and impact. This invention provides a contact assembly which absorbs the impact of the rocket if it is jammed into the tube, thereby decreasing the likelihood of damage.

Among the several objects of the invention may be noted the provision of a contact assembly which will maintain constant positive electrical contact with the ignition cap of a rocket throughout jostling, shaking, and other types of movement of the rocket launching device; the provision of a contact assembly which assists in holding the rocket in place within the rocket launching tube; the provision of a contact assembly which will absorb the shock caused by hastily jamming the rocket into the rocket launching tube; and the provision of a contact assembly which is sturdy in construction and which is durable. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a perspective view showing the contact assembly mounted on a rocket launcher tube;

FIG. 2 is a perspective view showing the contact assembly partially removed from a rocket launcher tube; and FIG. 3 is a sectional view taken along line 3—3 of FIG. 1.

Corresponding reference characters indicate corresponding parts throughout the several views of the drawings.

Referring now to the drawings, 14 designates a rocket launching tube having a rocket 15 slidably mounted therein. Adjacent the rearward end of rocket launching tube 14 is a tube window 16 forming communication between the interior and exterior of launching tube 14. An insulator gasket 18 is positioned over the exterior of tube 14 and has a gasket window 20 formed therein. Gasket window 20 is positioned directly over tube window 16. Insulator gasket 18 is constructed of a dielectric material. Apertures 22, 24, 26, are formed in insulator gasket 18, and apertures 28, 30, 32, are formed in tube 14. These apertures are so positioned that apertures 22, 24, 26, of insulator gasket 18 are directly over apertures 28, 30, 32, of tube 14.

Numeral 34 designates a striker bracket having a striker end 36 and a guide end 38. Formed in striker end 36 is a yoke 40 having yoke arms 42, 44, positioned oppositely with respect to each other. Arcuate grooves 46, 48, are positioned opposite each other on the interior faces of yoke arms 42, 44. Extending downwardly from the bottoms of yoke arms 42, 44, are striker bracket arms 50, 52. Guide end 38 of striker bracket 34 is equipped with a vertically disposed shoulder 54 having a horizontally disposed guide aperture 56 therein. Also in striker bracket 34 are vertically disposed apertures 58, 60, which are adapted to coincide directly over apertures 22, 24, of insulator gasket 18. Arcuate grooves 46, 48, are adapted to be positioned directly over aperture 26 of insulator gasket 18.

Striker bracket 34 is positioned over insulator gasket 18 which is positioned over tube 14. Apertures 58, 60, and the aperture defined by arcuate grooves 46, 48, of striker bracket 34, are respectively aligned directly above apertures 22, 24, 26, of insulator gasket 18. Apertures 22, 24, 26, of insulator gasket 18 are aligned over apertures 28, 30, 32, of tube 14, respectively. A rivet 62 extends through aperture 28 of tube 14, aperture 22 of insulator gasket 18 and aperture 58 of striker bracket 34. A rivet 64 extends through aperture 30 of tube 14, aperture 24 of insulator gasket 18, and aperture 60 of striker bracket 34. A pin 66 extends through aperture 32 of tube 14, aperture 26 of insulator gasket 18, and arcuate grooves 46, 48, of striker bracket 34. An insulator washer 68 is slipped over the upper end of pin 66 and protrudes into the aperture formed by arcuate grooves 46, 48, to prevent contact between pin 66 and yoke arms 42, 44, of striker bracket 34. Insulator washer 68 is constructed of electrical insulating material, thereby preventing the passage of electrical current between striker bracket 34 and rocket tube 14 by means of pin 66. A collar 70 is operatively secured to the upper end of pin 66 to hold it in position and to secure striker bracket 34 and insulator gasket 18 to tube 14. Insulator cup washers 72, 74, are seated in apertures 58, 60, of striker bracket 34 to electrically insulate between bracket 34 and rivets 62, 64. Insulator gasket 18 is also constructed of electrical insulating material of any conventional type, and because of its position between striker bracket 34 and tube 14, it insulates the two against the passage of electrical current therebetween. Thus insulator gasket 18, insulator washer 68, and insulator cup washers 72, 74, fully insulate striker bracket 34 from tube 14 so that electrical current is prevented from passing therebetween.

The securement of striker bracket 34 to tube 14, as described above, causes striker bracket 34 to be positioned with striker bracket arms 50, 52, protruding downwardly into the interior of tube 14 through insulator gasket window 20 and tube window 16. A striker arm 76 is pivotally mounted between striker bracket arms 50, 52, by means of a dowel pin 78. Striker arm 76 has an upper portion 80 extending between yoke arms 42, 44, to a point above striker bracket 34. Striker arm 76 has a lower portion 82 extending downwardly into the interior of tube 14. Lower portion 82 of striker arm 76 has a contact point 84 positioned thereon and located adjacent an ignition cap 86 on the rearward end of rocket 15.

A longitudinal spring guide 88 has a sliding end 90 slidably protruding through guide aperture 56 of bracket 34. A spring guide yoke 92 is positioned on the end of spring guide 88 opposite sliding end 90. Upper portion 80 of striker arm 76 is pivotally secured between the arms of spring guide yoke 92 by means of a spring guide pin 94. A hex nut 96 is operatively secured about sliding end 90 forwardly of shoulder 54 of striker bracket 34. Hex nut 96 serves as a stop to limit the rearward sliding movement of spring guide 88 through guide aperture 56. A lead wire 98 is electrically connected to spring guide 88 at a position forward of hex nut 96. A second nut 100 is secured to sliding end 90 at its extreme forward end. Thus lead wire 98 is held to spring guide 88 between hex nut 96 and second nut 100.

A coiled spring 102 is slipped over spring guide 88 and is compressibly positioned with one of its ends abutting against shoulder 54 of striker bracket 34 and its opposite end abutting against a flange 104 on spring guide 88. Because spring 102 is in a partially compressed position it tends to slide spring guide 88 rearwardly through guide aperture 56 of striker bracket 34. As spring guide 88 is urged rearwardly by spring 102 it causes upper portion 80 of striker arm 76 to move rearwardly, pivoting about dowel pin 78. This rotational movement of striker arm 76 causes contact point 84 of striker arm 76 to be yieldably pressed forwardly against ignition cap 86 of rocket 15. Spring guide 88 is in electrical contact with lead wire 98 and is constructed of a material which is a good electrical conductor. It is also in electrical contact with striker arm 76 which is also constructed of electrical conducting material. Thus a line of conduction is provided from lead wire 98 through spring guide 88 and striker arm 76 to ignition cap 86 of rocket 15.

When rocket 15 is initially inserted into tube 14 it strikes striker arm 76 forcing it to rotate about dowel pin 78 with spring 102 yieldably resisting this rotational movement. The ability of striker arm 76 to yield when rocket 15 is inserted helps to avoid breakage of striker arm 76 and therefore prevents subsequent misfiring due to lack of electrical contact with the rocket. Rocket 15 is slidably moved rearwardly in tube 14 until stop 106 engages stop flange 108 of rocket 15, thereby holding rocket 15 against further rearward movement within tube 14. A spring detent 110 having a notch 112 therein is provided within launcher tube 14 for snapping over stop flange 108 to limit forward movement of rocket 15 in launcher tube 14. The yieldable resistance of striker arm 76 to rocket 15 as it is inserted into tube 14 also helps to hold rocket 15 against the forward edge of notch 112, and thereby inhibits longitudinal movement of the rocket within tube 14.

The yieldable resistance of striker arm 76 against rearward movement of rocket 15 also causes contact point 84 to be held in constant positive electrical contact with ignition cap 86. This positive electrical contact is maintained throughout vibration and jostling commonly encountered by rocket launchers when in use. Thus the contact assembly of this invention helps to assure that there will be electrical contact with ignition cap 86 of rocket 15 at all times.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electrical contact assembly for a rocket launcher; said launcher including a rocket launcher tube having forward and rearward ends, said tube being adapted to hold a rocket and being provided with a window opening into its interior; said rocket including a rearwardly presented ignition cap adapted to be positioned adjacent said window; said contact assembly comprsing a striker bracket mounted on the outside of said tube and including two striker bracket arms, at least one striker bracket arm extending through said window into the interior of said tube; a striker arm pivotally mounted to said bracket arm or swinging movement about an axis within said tube; said striker arm having an upper portion extending outside said tube and an inner portion within said tube; said inner portion positioned rearwardly of said ignition cap of said rocket; means for introducing electrical current to said striker arm; spring means yieldably urging said upper portion of said striker arm about said axis in a direction which causes said inner portion to be urged forwardly into positive electrical contact with said ignition cap; said bracket arms being spaced from one another; said striker arm extending between said bracket arms; and an elongated spring guide slidably mounted on said bracket for sliding movement in a direction parallel to the longitudinal axis of said tube; said spring guide being hinged to said upper portion of said striker arm, whereby sliding movement of said spring guide causes said striker arm to pivot about said axis; said spring means being an elongated coil spring surrounding said spring guide.

2. An electrical contact assembly according to claim 1 wherein said spring guide and said striker arm are made of an electrical conductive material; electrical lead means being connected to said spring guide so as to provide a line of electrical conduction through said spring guide and said striker arm to said ignition cap; insulator means being between said tube and said bracket so as to prevent electrical contact therebetween.

3. An electrical contact assembly according to claim 1 wherein said spring guide includes a yoke having yoke arms; said upper portion of said striker arm being pivotally secured between said yoke arms.

4. A contact assembly according to claim 1 wherein said spring guide includes stop means adapted to limit the sliding movement of said spring guide with respect to said bracket and thereby to limit forward movement of said inner portion of said striker arm at an extreme forward position; detent means within said tube adapted to engage and hold said rocket in a predetermined position within said tube; said ignition cap engaging said inner portion and urging it rearwardly from its forward position when said rocket is in said predetermined position.

References Cited
UNITED STATES PATENTS

| | | | |
|---|---|---|---|
| 2,460,929 | 2/1949 | Goff | 89—1.807 |
| 2,461,574 | 2/1949 | Skinner et al. | 89—1.813 |
| 2,557,151 | 6/1951 | Skinner et al. | 89—1.814 |
| 2,712,270 | 7/1955 | Green | 89—1.807 |

SAMUEL W. ENGLE, Primary Examiner

U.S. Cl. X.R.

89—1.814